United States Patent
Jamie et al.

(10) Patent No.: US 6,986,577 B1
(45) Date of Patent: Jan. 17, 2006

(54) EYEGLASSES WITH EXTENSION MEMBER SUPPORTS

(76) Inventors: Shahrooz S. Jamie, P.O. Box 10, Clay, WV (US) 25043; Sharon S. Jamie, P.O. Box 10, Clay, WV (US) 25043

( * ) Notice: Subject to any disclaimer, the term of this patent is extended or adjusted under 35 U.S.C. 154(b) by 0 days.

(21) Appl. No.: 10/992,412

(22) Filed: Nov. 18, 2004

(51) Int. Cl.
*G02C 5/14* (2006.01)

(52) U.S. Cl. .................. 351/111; 351/119; 351/121; 351/153

(58) Field of Classification Search ........ 351/111–109, 351/41, 44, 153
See application file for complete search history.

(56) References Cited

U.S. PATENT DOCUMENTS

| | | |
|---|---|---|
| 182,013 A | 9/1876 | Andross |
| 1,026,272 A | 5/1912 | Leveque |
| 1,819,738 A | 8/1931 | Daniels |
| 2,659,266 A | 11/1953 | Swisher |
| 3,495,898 A | 2/1970 | Del Vecchio |
| 3,840,294 A * | 10/1974 | Kneier .................. 351/59 |
| 3,955,885 A | 5/1976 | Aronsohn |
| 4,006,974 A | 2/1977 | Resnick |
| 4,129,362 A | 12/1978 | Lorenzo |
| 4,886,349 A | 12/1989 | Willis |
| 5,016,999 A | 5/1991 | Williams |
| 5,506,638 A | 4/1996 | Donner |
| 5,666,182 A | 9/1997 | Donner |
| 5,859,684 A * | 1/1999 | Rittmann .................. 351/111 |
| 5,956,117 A | 9/1999 | Suh et al. |
| 6,142,623 A | 11/2000 | Jones |
| 6,325,507 B1 | 12/2001 | Jannard et al. |
| 6,648,471 B1 | 11/2003 | Dalrymple et al. |

* cited by examiner

*Primary Examiner*—Huy Mai

(57) ABSTRACT

Eyeglasses with extension member supports, for supporting the eyeglass frame off of and above the nasal bone, comprised of an eyeglass frame having a pair of laterally aligned lens and, optionally, a pair of circuitous frames, each circuitous frame circumscribing and enclosing either lens; a bridge disposed medially between either lens, a pair of temple arms with distal and proximal ends, and a pair of extension members, each extension member having an upper end articulating with either lens, or its circuitous frame if provided, and a lower end articulating with the proximal end of either temple arm. Each temple arm articulates with the lower end of the extension member at an angle rotated in the parasagittal plane, downward from the traverse plane of the lenses. This rotation permits the temple arms to rest upon the zygomatic arch of the wearer's cranium, thereby supporting the frame off of and above the nasal bone of the wearer.

11 Claims, 3 Drawing Sheets

EYEGLASSES WITH EXTENSION MEMBER SUPPORTS

BACKGROUND OF THE INVENTION

1. Field of the Invention

The invention disclosed herein relates to eyeglasses and eyeglass frames with alternative means of support on the face.

2. Description of the Related Art

Eyeglasses are commonly used to correct vision impairments and as well as to protect the eyes in hazardous environments. Typical eyeglass frames are comprised of common structures for positing the frame on the face of the wearer. These structures include temple arms, one end of which loops behind the ears, and a nose bridge or nose pads attached to the nose bridge, which rest upon the nose of a wearer. The two ear loops on the temple arms and the nose bridge or pads provide three points of contact with the face of the user, which provides sufficient support to maintain the frames in a desired position and alignment. The nose bridge or pads support a majority of the weight of the frames. The end loops of the temple arms engage with the cartilage of the ears and prevent the frame from sliding away from or down the nose.

Rhinoplasty, or cosmetic surgery to reshape the nose, is one of the more commonly administered forms of cosmetic surgery procedures. According to the American Society of Plastic Surgeons, in the year 2002 approximately 354,327 rhinoplasty procedures were performed. A substantial recovery period is involved after rhinoplasty, during which the nose is swollen, inflamed and painfully sensitive to touch or pressure. The inflammation and sensitivity usually preclude use of common types of eyeglass frames.

In other cases, the use of conventional eyeglass frames is undesirable because the nose pads cause indentation marks in the skin of the nose, or pull flaccid skin downward, causing cosmetically unappealing wrinkles in the skin around the nose.

The use of contact lenses may alleviate these undesirable consequences, but cannot be worn by or are uncomfortable to many people. Further, contact lenses do not provide any physical protection to the eye, and hard lenses disposed anterior of the eye are still necessary to provide this protection, as well as vision correction.

A number of examples of modified eyeglass frames are available in the prior art. For example, U.S. Pat. No. 182,013, issued to Andross on Sep. 12, 1876; U.S. Pat. No. 1,026,272, issued to Leveque on May 14, 1912 and U.S. Pat. No. 1,819,738, issued to Daniels on Feb. 23, 1928, each disclose a spectacles or eyeglasses wherein the lenses are supported by a frame that completely encircles the rear of the head. The spectacles are maintained on the head by pressing the frame around the lenses against the socket surrounding the eye using tension in the frame. This method can be uncomfortable and cause irritation to the skin around the eye socket.

U.S. Pat. No. 3,955,885, issued to Aronsohn on May 11, 1976, and U.S. Pat. No. 5,666,182, issued to Donner each disclose an eyeglass frame with a support member disposed, either permanently or removably, to the lower edge of the frame. These are capable of supporting the eyeglass frame off the bridge of the nose, but the positioning of the support member along the lower frame edge causes an obstruction to the downward field of vision, a disadvantage especially for those with bifocal lenses.

An eyeglass frame which supports the frame off the bridge of the nose without interfering with the normal field of vision is desirous.

SUMMARY OF THE INVENTION

To alleviate or improve upon the disadvantages in the prior art, modifications to conventional eyeglass frames comprise a variety of elements to provide support for the frames on other portions of the wearer's face or head. These alternative support points position the eyeglass frames properly without the need for contact with the nasal bridge.

One means of supporting the frame of the eyeglasses off the bridge of the nose uses the temple arms to derive support from the cheekbone, called the zygomatic bone, and from the zygomatic arch, the process extending around the side of the head from the cheekbone towards the temple areas. However, the temple arms can rest on the zygomatic arch only if they are tilted downward from where the ear loop engages the top of the auricle of the ear at approximately a 20 degree angle. However, in a conventional pair of eyeglasses, the temple arms, when conjoined directly to the lateral edges of the frame, cannot be tilted without displacing the lenses from the frontal plane aligned with the pupils of the eye.

To dispose the frame in front of the eyes, while allowing the temple arms to tilt at an angle from the ear downward from horizontal, the invention disclosed herein disjoins the proximal end of each temple arm from the lateral edge of the frame. A pair of elongated extension members is provided on the frame, having a first end of each extension member disposed on the frame and a second end disposed at a point inferior and approximately aligned vertically with the lateral edge of the frame. The proximal end of each temple arm articulates with the second, inferior end of the extension member, either rigidly or pivotally. This articulation with the inferior end of the extension member rather than the lateral edge of the frame disposes each temple arm at the preferred downward angle for resting on the zygomatic arch, while maintaining lenses aligned with the eyes and the bridge off of the nasal bone.

One objective of this invention is to provide an eyeglass frame with means for elevating the bridge on a typical frame off the nasal bridge.

Another objective is to support an eyeglass frame on the face by a part of the face or head other than the nasal bridge.

Another objective of this invention is to provide such means without impeding vision, especially in the downward direction.

These and other objectives and advantages of the invention will become apparent from the description which follows. In the description, reference is made to the accompanying drawings, which from a part hereof, and in which is shown by way of illustration specific embodiments in which the invention may be protected. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

DETAILED DESCRIPTION OF THE INVENTION

The following discussion describes in detail one or more embodiments of the invention. The discussion should not be construed, however, as limiting the invention to those particular embodiments, and practitioners skilled in the art will recognize numerous other embodiments as well. The complete scope of the invention is defined in the claims appended hereto.

As used herein, the following words or terms have the indicated meaning:

"Inferior" or "inferiorly" means downward, towards the feet.

"Lateral" or "laterally" means horizontally or in a horizontal direction away from the sagittal plane or vertical centerline, either left, right, or both.

"Medial" or "medially" means horizontally or in a horizontal direction towards the sagittal plane of the body.

"Parasagittal" or "parasagitally" means in a plane parallel to the sagittal plane of the body.

"Sagittal" or "sagittally" means in a vertical plane passing through the vertical centerline of the body and dividing the body into right and left halves.

"Transverse" means in a horizontal plane parallel to the ground, dividing above from below.

"Frontal" means in a vertical plane, perpendicular to the ground, dividing front from back.

"Anterior" or "anteriorly" means towards the front of the body.

"Posterior" or "posteriorly" means towards the back of the body.

When the above anatomically related directions or orientations are used in reference to the disclosed invention, reference to the invention is based on the invention when worn in the customary manner or in the manner described for use on the face of a wearer.

Figure 1:
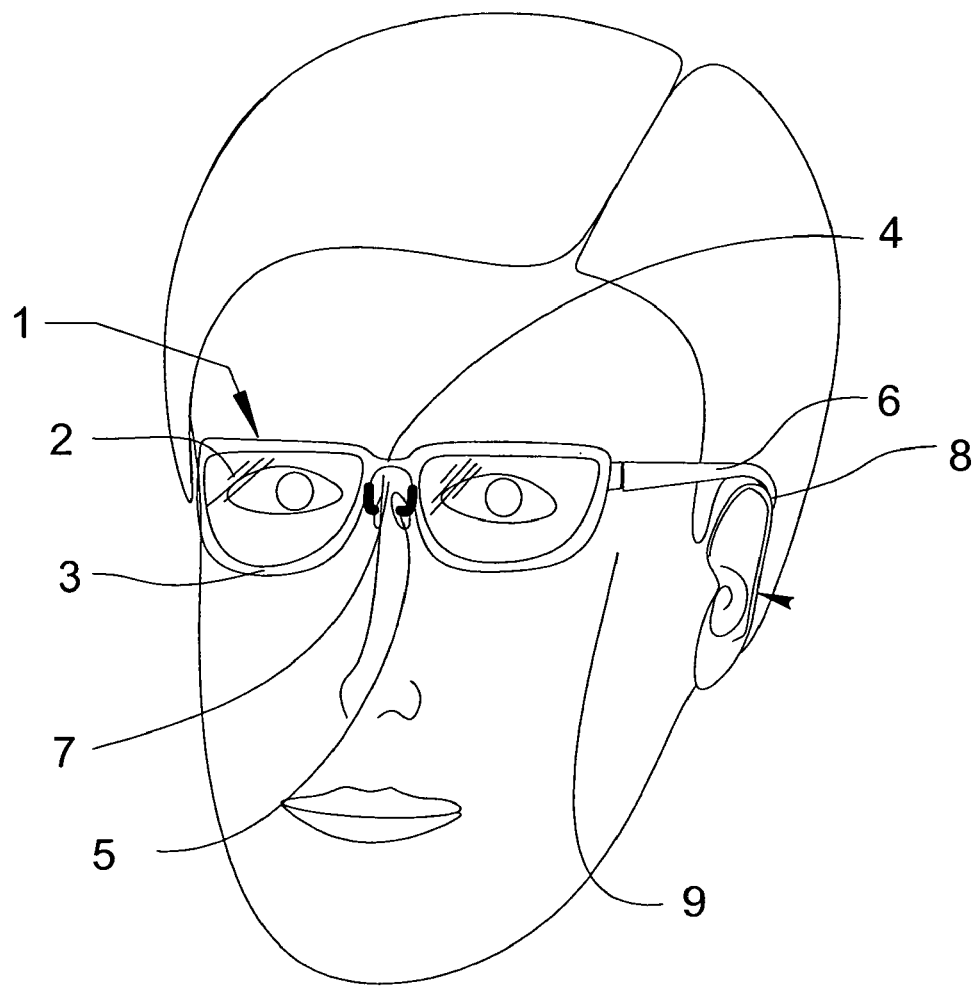
FIG. 1 is a diagram displaying a conventional pair of eyeglasses in use.

As shown in FIG. 1, a typical pair of conventional eyeglasses in the prior art is comprised of a pair of transparent lenses 2, each possibly enclosed within a circuitous frame 3, connected by a bridge 4, together forming an eyeglass frame 1. On the lateral edge of each frame 1 is disposed a temple arm 6, comprised of an elongated member engaged, usually pivotally, to the eyeglass frame 1 at one end and having an arcuate ear loop 8 at the other end. The bridge 4 is either shaped to conform with the shape of a typical nasal bridge 4, or has disposed on it a pair of nose pads 5, which are either adjustable or fixed, designed to rest upon the nasal bone 7.

The typical pair of eyeglasses is worn by resting the bridge 4, or the nose pads 5 if so equipped, on the nasal bone 7 and then engaging the ear loops 8 at the distal end of each temple arm 6 with the rear of the ear lobes. The friction of the nose pads 5 prevent the eyeglass frame 1 from sliding down the nose, while the tension from the ear loops 8 maintain the eyeglass frame 1 in vertically in front of the eyes.

In some designs, the proximal end of each temple arm 6 rigidly articulates with the lateral edge of the frame 1, at an angle generally perpendicular to the plane of the eyeglass frame 1. In other designs, the temple arms 6 pivotally articulates with the eyeglass frame 1, permitting each temple arm 6 to pivot and flex to a closed position behind and parallel to the plane of the eyeglass frame 1. When in use, the temple arms 6 are extended to the open position, perpendicular to the plane of the eyeglass frame 1. When the eyeglasses are donned by a wearer, the eyeglass frame 1 is substantially parallel with the frontal plane of the wearer, and the temple arms 6 are coplanar with a parasagittal plane on either side of the head. The temple arms 6 are also substantially horizontal and lie within a transverse plane of the eyes.

Figure 2:
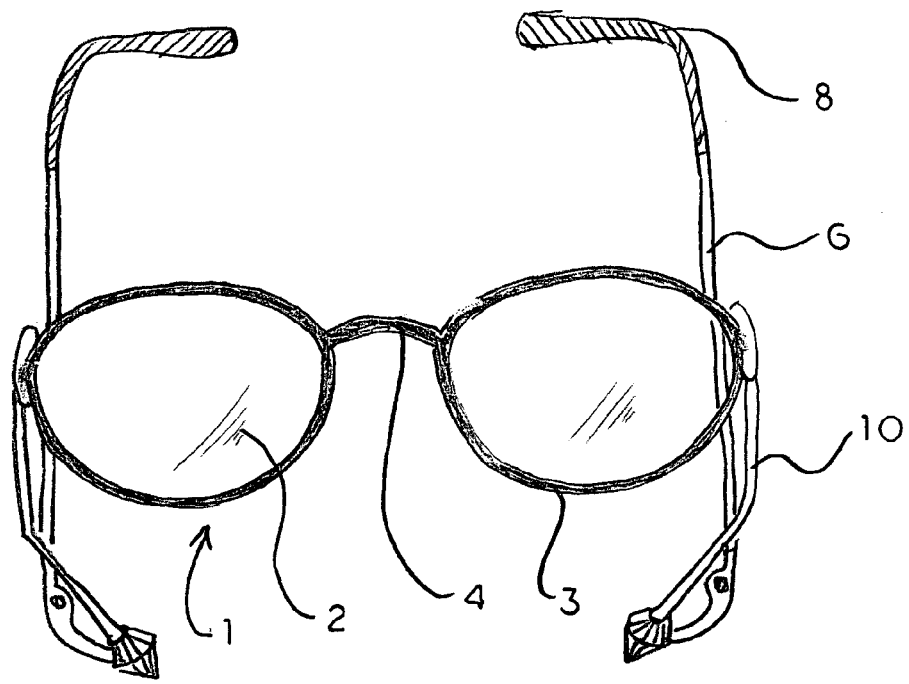
FIG. 2 is a front elevation orthogonal view of a first embodiment of the invention.
Figure 3:
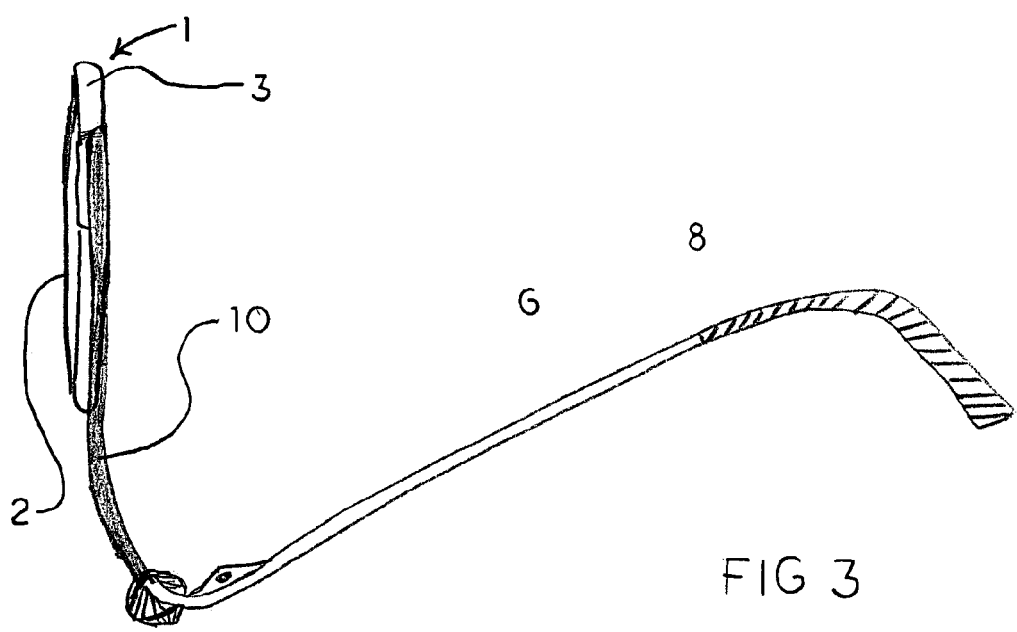
FIG. 3 is a side elevation orthogonal view of a second embodiment of the invention.

To achieve the objective of the present invention in providing a means for elevating the eyeglass frame 1 off the nasal bone 7 and supporting it by another part of the face or head, means are provided for extending the frame 1 above the proximal ends of the temple arms 6. This permits the temple arms 6 to rotate inferiorly, in the parasagittal plane. As shown in FIGS. 2 and 3, the invention is comprised of a frame 1, comprised of a pair of laterally-aligned lenses 2, a circuitous frame 3 circumscribing and enclosing each lens 2, if desired, and a bridge 4, disposed between the lenses 2, or their circuitous frames 3, if provided, engaging with the medial edges of each lens 2 or circuitous frame 3. A pair of temple arms 6 is provided, each having a distal end and a proximal end. An ear loop 8 is disposed at the distal end of each temple arm 6, which engages with the upper surface of either ear.

The improvement over the prior art of this invention is comprised of an extension member 10, having an upper end and a lower end. The lower end articulates with the proximal end of the temple arm 6. The articulation of the extension member 10 with the temple arm 6 may be rigid, or, preferably, pivotal, allowing the temple arms 6 to be flexed behind and parallel to the plane of the lenses 2, for compact storage when not in use, or to extend posteriorly perpendicular to the frontal plane of the lenses 2 for use.

The articulation of the lower end of the extension member 10 and the proximal end of the temple arm 6 is disposed inferior of the respective lens 2, and lateral of the vertical centerline of that lens 2. The vertical distance of the lower end of the extension member 10 from the horizontal line of the lenses 2 is specified to effect a rotation of the temple arm 6 which would dispose the temple arm on the zygomatic arch 9 of the wearer's cranium. Preferably, this rotation of the temple arms 6 is 45 degrees downward from horizontal within the parasagittal plane of each respective temple arm 6. This rotation disposes a medial section of the temple arm onto and is supported by the zygomatic arch 9 of the wearer, providing the support for holding the frame 1 above the nasal bone 7.

The upper end of the extension member 10 conjoins with the lens 2, or a circuitous frame 3 if provided. In the preferred embodiment, shown in FIGS. 2 and 3, the upper end of each extension member 10 conjoins with the lateral edge of either lens 2 or circuitous frame 3. Preferably, the extension member 10 conjoins tangentially with the arc of the lens 2 or circuitous frame 3. This design provides a clear unobstructed view downward below the frame 1.

Figure 4:
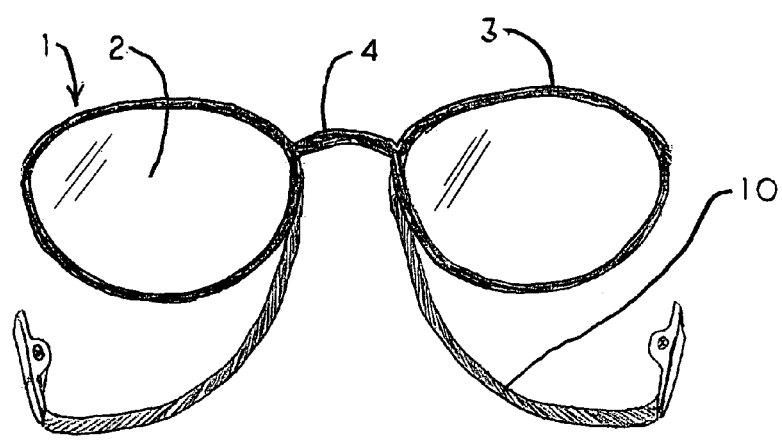
FIG. 4 is a front elevation orthogonal view of a third embodiment of the invention.
Figure 5:
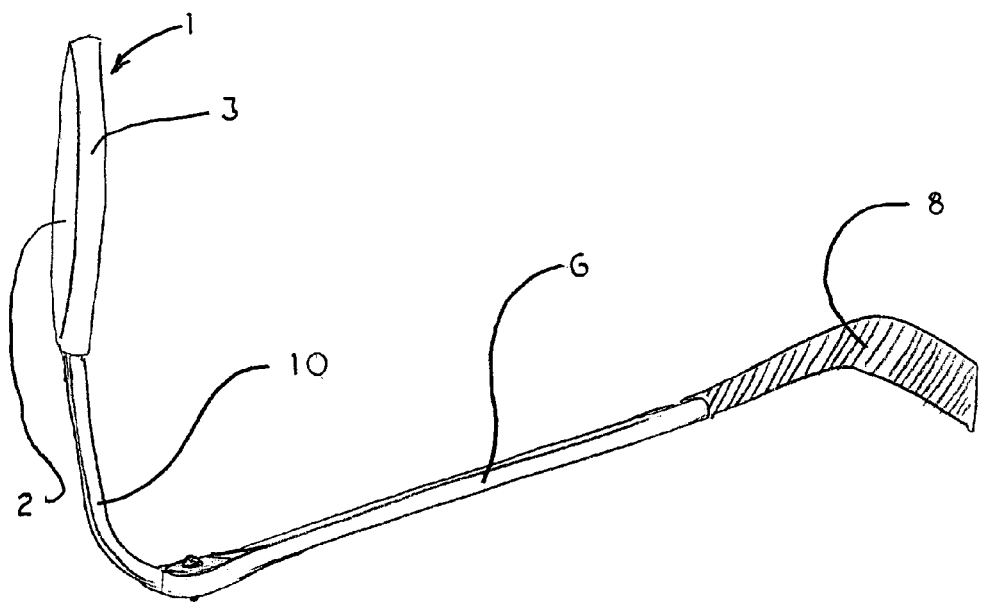
FIG. 5 is a side elevation orthogonal view of a third embodiment of the invention.

In another embodiment of the invention, shown in FIGS. 4 and 5, the upper end of the extension member 10 articulates with the medial edge of either lens 2 or circuitous frame 3. The extension member 10 is comprised of an elongated arcuate member extending to and tangentially articulating with the medial edge of either lens 2 or circuitous frame 3. This design provides a slight medial torque on each temple arm 6 from the weight of the frame 1 transmitted through the extension member 10. This slight torque provides slightly greater pressure against the zygomatic arch 9 by each temple arm 6, increasing the stability of the glasses when in use.

In either embodiment, the extension member 10 is fabricated of a material similar to the temple arms 6 and frame 1, and articulate with the lens or frames by known methods similar to glasses of similar materials and conventional design.

While various embodiments of the invention have been described above, it should be understood that they have been presented by way of example, and not limitation. It will be apparent to person skilled in the relevant art that various changes in form and detail may be made therein without departing from the spirit, and scope and application of the invention. This is especially true in light of technology and terms within the relevant art that may be later developed. Thus, the present invention should not be limited by any of the above-described exemplary embodiments, but should only be defined in accordance with the appended claims and their equivalents.

We claim:

1. Eyeglasses with temple arm supports, comprised of:
   a) a frame, comprised of a pair of lenses disposed laterally adjacent to one another and a bridge disposed between the two lenses and engaging the medial edge of either lens;
   b) a pair of temple arms, each having a proximal and a distal end; and,
   c) a pair of extension members, each having an upper end and a lower end, whereby the proximal end of each temple arm articulates with the lower end of either extension member, and the upper end of each extension member articulates with either lens.

2. The eyeglasses of claim 1, wherein the upper end of the extension member articulates with the lateral edge of the adjacent lens.

3. The eyeglasses of claim 1, wherein the upper end of the extension member articulates with the medial edge of the adjacent lens.

4. The eyeglasses of claim 1, wherein the articulation between the lower end of the extension member and the proximal end of the temple arm is rigid.

5. The eyeglasses of claim 1, wherein the articulation between the lower end of the extension member and the proximal end of the temple arm is pivotal.

6. The eyeglasses of claim 1, wherein an ear loop is disposed on the distal end of each temple arm.

7. Eyeglasses with temple arm supports, comprised of:
   a) a frame, comprised of a pair of lenses disposed laterally adjacent to one another and a bridge disposed between the two lenses and engaging the medial edge of either lens;
   b) a pair of circuitous frames, each circuitous frame circumscribing and enclosing either lens;
   c) a pair of temple arms, each having a proximal and a distal end; and,
   d) a pair of extension members, each having an upper end and a lower end, whereby the proximal end of each temple arm articulates with the lower end of either extension member, and the upper end of each extension member articulates with either circuitous frame.

8. The eyeglasses of claim 7, wherein the upper end of the extension member articulates with the lateral edge of the circuitous frame.

9. The eyeglasses of claim 7, wherein the upper end of the extension member articulates with the medial edge of the circuitous frame.

10. The eyeglasses of claim 7, wherein the articulation between the lower end of the extension member and the proximal end of the temple arm is rigid.

11. The eyeglasses of claim 7, wherein the articulation between the lower end of the extension member and the proximal end of the temple arm is pivotal.

* * * * *